United States Patent
Shtilkind et al.

(10) Patent No.: US 11,762,856 B2
(45) Date of Patent: Sep. 19, 2023

(54) QUERY RESPONSE MODULE AND CONTENT LINKS USER INTERFACE

(71) Applicant: ServiceNow, Inc., Santa Clara, CA (US)

(72) Inventors: Eugene Shtilkind, Poway, CA (US); Andrii Kovalenko, La Jolla, CA (US); Kai Guo, San Diego, CA (US); Rohit Katta, Mountain View, CA (US); Yonatan Perez, San Diego, CA (US); Sancho Pinto, Alameda, CA (US); James Brown, La Mesa, CA (US)

(73) Assignee: ServiceNow, Inc., Santa Clara, CA (US)

( * ) Notice: Subject to any disclaimer, the term of this patent is extended or adjusted under 35 U.S.C. 154(b) by 78 days.

(21) Appl. No.: 16/842,540

(22) Filed: Apr. 7, 2020

(65) Prior Publication Data
US 2021/0311939 A1    Oct. 7, 2021

(51) Int. Cl.
| | |
|---|---|
| G06F 16/00 | (2019.01) |
| G06F 16/2455 | (2019.01) |
| G06F 16/2453 | (2019.01) |
| G06F 16/248 | (2019.01) |
| G06F 16/182 | (2019.01) |
| G06F 16/16 | (2019.01) |
| G06N 20/00 | (2019.01) |
| G06N 5/025 | (2023.01) |
| G06N 3/044 | (2023.01) |

(Continued)

(52) U.S. Cl.
CPC ........ *G06F 16/2455* (2019.01); *G06F 16/168* (2019.01); *G06F 16/182* (2019.01); *G06F 16/248* (2019.01); *G06F 16/24532* (2019.01); *G06N 3/044* (2023.01); *G06N 3/045* (2023.01); *G06N 5/02* (2013.01); *G06N 5/025* (2013.01); *G06N 20/00* (2019.01)

(58) Field of Classification Search
CPC .. G06F 16/2455; G06F 16/182; G06F 16/168; G06F 16/24532; G06F 16/248; G06N 20/00; G06N 5/025
USPC .................................................. 707/705–780
See application file for complete search history.

(56) References Cited

U.S. PATENT DOCUMENTS

| | | | | |
|---|---|---|---|---|
| 8,738,587 | B1 * | 5/2014 | Bitincka | G06F 16/2455 |
| | | | | 707/821 |
| 9,589,231 | B2 * | 3/2017 | Csurka | G06N 5/04 |
| 11,032,620 | B1 * | 6/2021 | Verma | G10L 15/1815 |

(Continued)

*Primary Examiner* — Michelle N Owyang
(74) *Attorney, Agent, or Firm* — Van Pelt, Yi & James LLP

(57) ABSTRACT

A specification of one or more query response modules from a third-party entity different from an entity providing a search service is received. A search query from a user is received. The search query is processed at least in part with the search service to determine whether any of the one or more query response modules are applicable to the search query. In response to a determination that at least one of the one or more query response modules is applicable to the search query, one of the query response modules is selected for the search query. The selected query response module is executed to determine a module answer content. The search query is processed to identify links to content responsive to the search query. A response to the search query is provided including by embedding the module answer content in a user interface providing at least a portion of the identified links.

20 Claims, 10 Drawing Sheets

(51) Int. Cl.
 *G06N 3/045* (2023.01)
 *G06N 5/02* (2023.01)

(56) References Cited

U.S. PATENT DOCUMENTS

| | | | | |
|---|---|---|---|---|
| 2008/0270201 | A1* | 10/2008 | Flaxer | G06Q 30/0201 |
| | | | | 705/7.29 |
| 2010/0082735 | A1* | 4/2010 | Petersen | H04L 12/6418 |
| | | | | 709/203 |
| 2012/0102024 | A1* | 4/2012 | Campbell | G06F 16/958 |
| | | | | 707/E17.107 |
| 2014/0250106 | A1* | 9/2014 | Shapira | G06F 16/248 |
| | | | | 707/722 |
| 2016/0147893 | A1* | 5/2016 | Mashiach | G06F 16/9535 |
| | | | | 707/710 |
| 2016/0179882 | A1* | 6/2016 | Glover | G06F 16/24524 |
| | | | | 707/756 |
| 2017/0031931 | A1* | 2/2017 | Linda | G06F 16/909 |
| 2017/0364593 | A1* | 12/2017 | Busey | G06N 20/00 |
| 2022/0292092 | A1* | 9/2022 | Brown | G06F 16/2246 |

* cited by examiner

QUERY RESPONSE MODULE AND CONTENT LINKS USER INTERFACE

BACKGROUND OF THE INVENTION

Computer information retrieval systems are designed to assist in locating information stored on computer systems. Examples of computer systems include personal computers and computer networks. In many scenarios, a search, such as a text search, is performed to retrieve information. Typically, a user interface accepts requests for information stored in various computer resources and returns search results. A common approach is to present search results as a list. However, such an approach usually requires a user of a computer information retrieval system to devote additional time and energy to analyze the search results in order to obtain the specific information the user was seeking. Thus, it would be beneficial to develop techniques directed toward providing improved search experiences associated with computer information retrieval systems.

BRIEF DESCRIPTION OF THE DRAWINGS

Various embodiments of the invention are disclosed in the following detailed description and the accompanying drawings.

DETAILED DESCRIPTION

Figure 1:
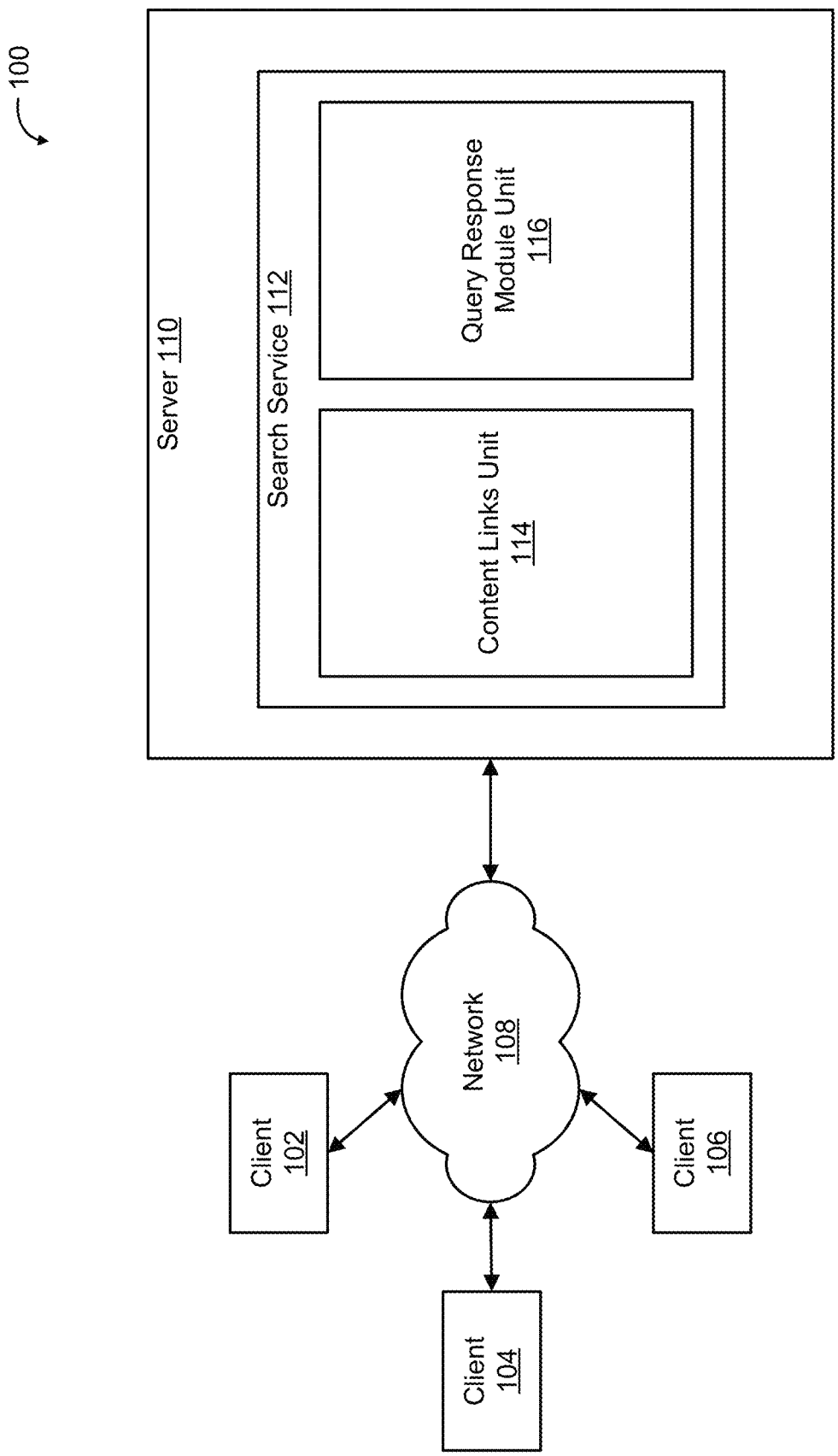
FIG. 1 is a block diagram illustrating an embodiment of a system for receiving search queries and providing responses.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Query response is disclosed. A specification of one or more query response modules from a third-party entity different from an entity providing a search service is received. A search query from a user is received. The search query is processed at least in part with the search service to determine whether any of the one or more query response modules are applicable to the search query. In response to a determination that at least one of the one or more query response modules is applicable to the search query, one of the query response modules is selected for the search query. The selected query response module is executed to determine a module answer content. The search query is processed to identify links to content responsive to the search query. A response to the search query is provided including by embedding the module answer content in a user interface providing at least a portion of the identified links.

A practical and technological benefit of the techniques disclosed herein is more effective and efficient information retrieval. A problem with existing search systems (also referred to herein as computer information retrieval systems, information retrieval systems, etc.) is that users of existing search systems need to click/navigate through links, folders, etc. to obtain the specific information that is desired. The technical solution to this problem using the techniques disclosed herein is to surface a more effective search response via a query response module. Query response modules are utilized to determine module answer content that can be embedded in a user interface that also presents search results in a conventional manner (e.g., a list of content links format). Stated alternatively, more targeted and relevant content is surfaced in query response module (also referred to herein as a component, widget, etc.) form using search as a channel. Search is a modality through which query response capabilities are surfaced. Oftentimes, query response modules provide answers to user queries more effectively than conventional search results content (e.g., content links). For example, queries related to dates can be answered more effectively with a calendar query response module than with a list of content links (since it is difficult to index a calendar using links).

Furthermore, an additional benefit of the techniques disclosed herein is that utilizing query response modules allows for flexible and extensible search systems because both an entity providing a search service (first-party entity) and a third-party entity utilizing the search service can design and create query response modules. The first-party entity providing the search service can be a provider of a platform as a service (PaaS) that includes the search service (e.g., a software platform that supports information technology service management and automation of common business processes). An instance of the platform can be provided by the first-party entity to each third-party entity. Flexibility and extensibility are increased because third-party query response modules can be used in the same platform provided by the first-party entity. Furthermore, it is also possible for different third parties to share query response modules among one another (e.g., by uploading to a share site), thus further promoting flexibility and extensibility.

FIG. 1 is a block diagram illustrating an embodiment of a system for receiving search queries and providing responses. In the example shown, system 100 includes clients 102, 104, and 106, network 108, and server 110. In the example illustrated, server 110 includes search service 112. The number of clients shown is merely illustrative. In various embodiments, clients 102, 104, and 106 are computer or other hardware devices that users utilize to submit search queries and receive/view responses. Examples of client hardware devices include desktop computers, laptop computers, tablets, smartphones, and other devices. Clients 102, 104, and 106 may be the same type of hardware device (e.g., all desktop computers) or different types of hardware devices (e.g., a desktop computer, a laptop computer, and a smartphone or some other combination of device types). In various embodiments, each client hardware device includes a software user interface through which users can submit search queries and receive/view responses. For example, the software user interface may be a web portal, internal network portal, or other portal that allows users to submit text search queries and graphically view and interact with received search results. Other examples of software from which search queries may originate include browsers, mobile apps, chat clients, etc. User interfaces are described in further detail below (e.g., see FIGS. 4*a* and 4*b*).

In the example illustrated, clients 102, 104, and 106 are communicatively connected to network 108. Search queries may be transmitted to and responses received from server 110 using network 108. Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 110 is a computer or other hardware component that provides search query response functionality. In various embodiments, server 110 includes a computer information retrieval system (e.g., a search service) that is designed to assist in locating information stored on computer systems.

In the example illustrated, search service 112 resides on server 110. In various embodiments, search service 112 is computer software that is configured to locate information in various computer resources. For example, in some embodiments, search service 112 locates information (e.g., text) relevant to search queries within computer files, webpages, and other data objects. Search service 112 may also locate information in metadata associated with computer files. For example, search service 112 may process titles, tags, keywords, summaries, etc. associated with computer resources to determine which computer resources are relevant to corresponding search queries. In various embodiments, search service 112 retrieves information in a document, documents themselves, metadata that describes data, and/or databases of texts, images, sounds, videos, etc. In some embodiments, the information that search service 112 locates resides in a storage system that is separate from server 110. For example, the information may be stored in one or more other servers (not shown in FIG. 1) to which server 110 is communicatively connected (e.g., via a network). It is also possible for the information to be located on server 110.

In the example shown, search service 112 includes content links unit 114 and query response module unit 116. Content links unit 114 is a software component of search service 112 that provides search query responses in the form of content links. As used herein, content links refer to references to data that a user can follow (e.g., by clicking on the content links). Content links can lead to entire documents or data objects or to specific elements within documents or data objects. In various embodiments, a content link is anchor text within a user interface that the user can click to access a source document or part thereof relevant to a search query. The anchor text is typically descriptive of the document/data object or specific element thereof (e.g., including a title or short description of the source data). In various embodiments, content links unit 114 generates a plurality of content links responsive to a search query. How well each content link matches the search query (e.g., relevance of each content link) may be ranked (e.g., according to a numeric score). The content links may be displayed to the user as a list with the most relevant content links displayed first. In various embodiments, the user manipulates the user interface to view the content links (e.g., by scrolling through a list of content links).

In some embodiments, content links unit 114 locates source documents/data objects based at least in part on searching through an index of the source documents/data objects. In various embodiments, indexing is utilized to reduce the source documents/data objects to the informative terms contained in them, thereby providing a mapping from the informative terms to the corresponding source documents/data objects and simplifying retrieval of the source documents/data objects. The index can be stored in the form of various data structures (e.g., direct index, document index, lexicon, inverted index, or any other type of index structure known by those skilled in the art). Furthermore, various efficient algorithms or schemes known by those skilled in the art may be used to search the index to retrieve sources documents/data objects relevant to a search query submitted to search service 112. For example, words from the search query may be searched for in the index.

Query response module unit 116 is a software component of search service 112 that provides search query responses in the form of query response module content (also referred to herein as module answer content). From a user perspective, each query response module can be regarded as a user interface component that maps to a search query set. Stated alternatively, from the user's perspective, different sets of search queries map to the appearance of different query response module content. Query response modules can be regarded as user interface components that accommodate specific user needs. For example, a member of an organization (e.g., a corporation, another type of business organization, a university, a government organization, or another type of entity) may enter the name of another organization member in a search box of a search portal (e.g., a search portal of the organization's instance of a PaaS system). Such a query can be associated with a specific query response module that shows a profile of the searched for organization member (e.g., including a photograph, full name, job title/function, phone number, e-mail, other contact information, etc.). One way in which a query response module differs from content links is that the query response module displays content (oftentimes a collection of content, e.g., photograph/other information associated with a person search) in a predictable format tailored to the set of search queries that surface the query response module content. Content links surface a set of references to source documents or parts thereof. Visual examples of query response module content and content links are described below (e.g., see FIGS. 4a and 4b).

Other examples are as follows: search queries related to fixing an office printer can trigger a specified query response module, search queries regarding how many days of paid time off can trigger a different specified query response module, a customer of an organization submitting a search query in an organization's external search portal (e.g., on the organization's webpage) regarding product issues (e.g., upgrading to a latest version of software, login issues, other troubleshooting, etc.) can trigger applicable query response modules to appear for the customer, and so forth. In many scenarios, a query response module displays a user interface object with actions that a user can take. For example, a search query related to a missing or stolen laptop can surface query response module content that includes a picture of a laptop associated with the user and actions the user can take (e.g., report the laptop as stolen, request a temporary laptop to use, etc.). In some scenarios, query response module content includes text (e.g., in response to a paid time off search query, a text answer may be displayed). In some scenarios, query response module content includes graphical data (e.g., a calendar with a date highlighted or circled may be displayed in response to a search query regarding a meeting date or other event date).

In some scenarios, a query response module performs snippet extraction. For example, an answer to a queried human resources question may be located in a human resources policy document. Instead of returning the policy document, a specific line in the policy document can be returned automatically. In some embodiments, the query response module first determines a likely source document that has an answer to a search query and then automatically searches for the answer in the source document based on the search query, e.g., by parsing the source document and mapping parsed portions to the search query.

Query response modules offer several benefits. Query response modules provide a rich search experience for users, which can significantly shorten/improve a user's journey for a wide variety of searches. Query response modules are flexible in that an organization's information technology administrators and developers can map intents and entities (intents and entities are described in further detail below) related to search queries to user interface components. Query response modules can be incorporated into a user interface system that also presents search results using content links, thereby offering users multiple ways to view search results at once. Query response modules allow for more targeted and relevant content to be surfaced using search as a channel because oftentimes query response modules provide answers to user queries more effectively than with content links. For example, queries related to dates can be answered more effectively with a query response module that displays a calendar.

A query response module can be created from a template of configuration options or components that are mapped to query intent. A first party provider of a search service (e.g., search service 112) can create query response modules. In various embodiments, third parties (e.g., users of the search service) also create query response modules (e.g., by using templates or other tools provided by the first party provider of the search service). By giving users the ability to create query response modules, query response modules tailored to users' specific needs can be created, thus providing more flexibility and extensibility to the search service and making the search service more effective in terms of delivering relevant content.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients may exist. The number of components and the connections shown in FIG. 1 are merely illustrative. Components not shown in FIG. 1 may also exist.

Figure 2:
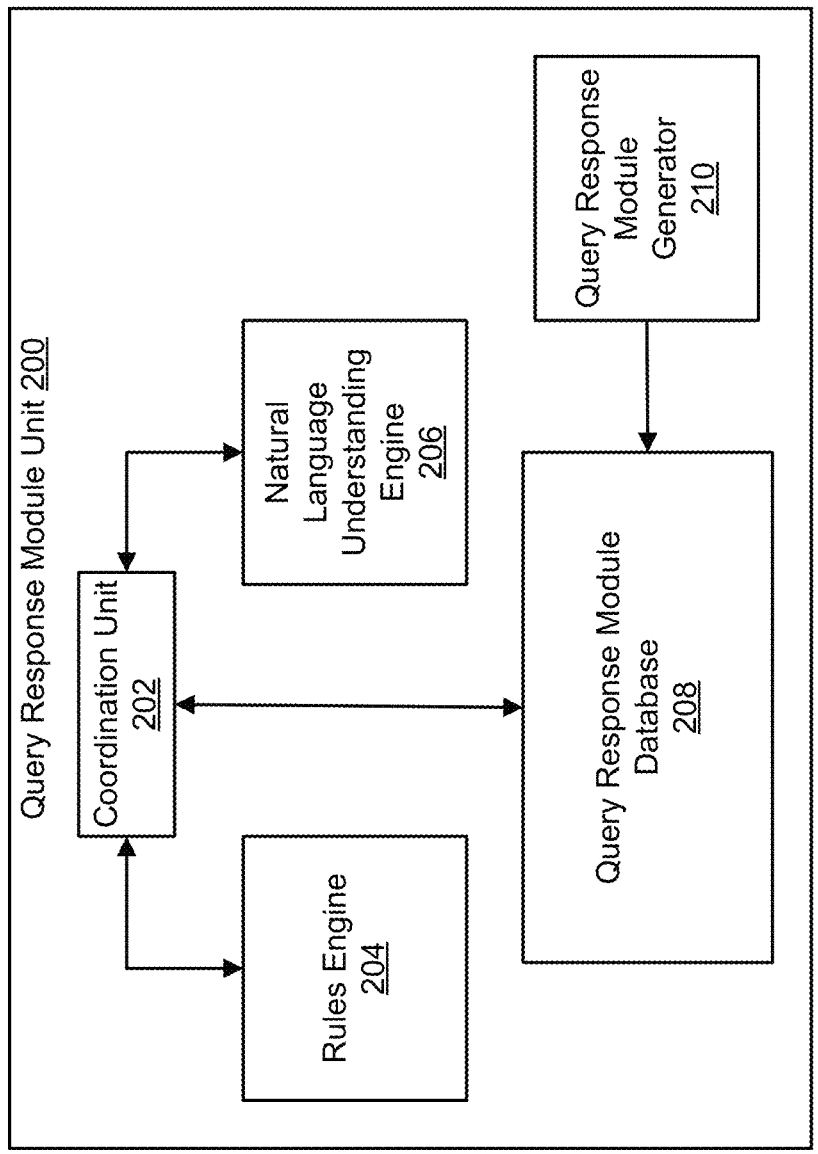
FIG. 2 is a block diagram illustrating an embodiment of a system for determining applicable query response modules.

FIG. 2 is a block diagram illustrating an embodiment of a system for determining applicable query response modules. In some embodiments, query response module unit 200 is query response module unit 116 of FIG. 1. In the example illustrated, coordination unit 202 is communicatively connected to rules engine 204, natural language understanding engine 206, and query response module database 208. In the example shown, query response module generator 210 is communicatively connected to query response module database 208.

In various embodiments, coordination unit 202 receives a search query. For example, coordination unit 202 may receive a search query submitted by client 102, 104, or 106 of FIG. 1 to search service 112 of FIG. 1. In various embodiments, coordination unit 202 issues the received search query to both rules engine 204 and natural language understanding engine 206 to determine whether there are any query response modules applicable to the search query according to a rules-based approach and a natural language understanding (NLU) based approach, respectively. The search query is issued to both rules engine 204 and natural language understanding engine 206, which operate in parallel, in order to avoid processing delay. The alternative of issuing the search query to the engines sequentially can result in processing delay compared to issuing in parallel if only one of the engines identifies an applicable query response module. If the engines identify different applicable query response modules, coordination unit 202 determines which engine takes precedence. In various embodiments, coordination unit 202 retrieves a query response module selected by either rules engine 204 or natural language understanding engine 206 from query response module database 208. Coordination unit 202 can then return the retrieved query response module to a client (e.g., client 102, 104, or 106 of FIG. 1). In various embodiments, once on the client, the query response module utilizes its own data fetch logic and business logic. For example, client software may make an application programming interface (API) call to fetch and process data and then display it on the client. The same query response module can be implemented on multiple clients using their native rendering technology.

In various embodiments, rules engine 204 utilizes a rules-based model to determine an applicable query response module matching a search query. Rules engine 204 may load rules from a configuration file (e.g., file storing rule definitions). In various embodiments, each rule definition is mapped to a query response module and uniquely identifies a query response module in the rules-based model. In many scenarios, a business process owner defines a key end user use case, a developer creates a query response module to address the use case, and the business process owner defines a rule for when to return the query response module. When an end user executes a search that matches the rule, the end user is presented with content of the query response module. For example, employees of an organization frequently searching for "what is the next company holiday" may prompt the organization (the business process owner in this case) to identify such a search as a critical use case and then communicate the need for a "Holiday Calendar" query response module to a developer (and the developer would then create the Holiday Calendar query response module). The organization may define a rule in the form of "query INCLUDES holiday" that can be mapped to the "Holiday Calendar" query response module. When an end user executes a search for "upcoming holiday", the search matches the defined rule and the end user would be presented with content by the "Holiday Calendar" query response module. In various embodiments, rules utilize keyword matching. Rules may use operators such as "includes", "contains", "starts with", "not", "or", "and", "ends with", etc.

In various embodiments, natural language understanding engine 206 parses utterances to extract intents and entities. As used herein, an utterance refers to a natural language example of a user intent, e.g., a text string from a search query entered by the user, an intent refers to something that the user wants to happen or that a system should do, and an entity refers to an object of, or context for, an action, e.g., a laptop, a user role, a priority level, or an instance. Intent and entity sets are mapped to query response modules. In some embodiments, if there is a match between the search query and the intent and entity set and the match reaches a specified confidence threshold, the query response module corresponding to the intent and entity set is returned.

In many scenarios, a business process owner defines a key end user use case, a developer creates a query response module to address the use case, and the business process owner defines a set of utterances (e.g., search queries) that match the use case. In various embodiments, natural language understanding engine 206 processes the utterances, extracting intents and entities, the extracted intents and entities are examined and refined by the business process owner and mapped to the query response module. The above example of employees of an organization searching for "what is the next company holiday" is described here again in order to compare an NLU-based approach with the rules-based approach described above. As described above with respect to the rules-based approach, a critical use case is identified and the need for a "Holiday Calendar" query response module is communicated to a developer that then creates the query response module. The organization may define a set of search queries (e.g., "what is the next holiday", "company holidays", "company holiday calendar", "upcoming holidays", etc.) matching the use case. Natural language understanding engine 206 can then extract intents and entities from the search queries and the organization can examine and refine intents and entities and map them to the "Holiday Calendar" query response module in a mapping table. When an end user types the search query "upcoming company holiday", the end user would be presented with the "Holiday Calendar" query response module showing the next company holiday.

In the rules-based approach, a search query is processed with rules (e.g., using rules engine 204) to determine a query response module. In the NLU-based approach, on the other hand, the search query is analyzed to determine its meaning (determining an intent/entity set the search query belongs to) (e.g., using natural language understanding engine 206) and this meaning (intent/entity) determines the query response module. In various embodiments, natural language understanding engine 206 utilizes a machine learning model to determine what a search query means. Stated alternatively, in various embodiments, a machine learning model is utilized to map utterances to intent/entity. For example, the machine learning model may determine that "when can I have a day off" and "when can I go have a fun day at the beach" map to displaying the next company holiday (intent) on the user's computer (entity). If the determined intent/entity maps to the "Holiday Calendar" query response module (e.g., according to a mapping table that maps intents/entities to query response modules), then the "Holiday Calendar" query response module showing the next company holiday would be displayed. Examples of machine learning models that can be utilized to perform NLU tasks include word vector representations, window-based neural networks, recurrent neural networks, long-short-term-memory models, recursive neural networks, and convolutional neural networks. Prior to utilizing the machine learning model, it is trained on a collection of utterance examples and their associated intents and entities. This training occurs before a new utterance (the search query) is processed using the machine learning model in inference mode.

In some embodiments, query response module database 208 stores query response modules available to provide to a user. In the example shown, query response module database 208 resides within query response module unit 200. It is also possible for query response module database 208 to be located separate from query response module unit 200 (e.g., on a different storage server). In some embodiments, query response modules are added to query response module database 208 by query response module generator 210. In some embodiments, query response module generator 210 receives specifications of query response modules. For example, query response module generator 210 may accept query response modules created by a first-party entity providing a search service (e.g., search service 112 of FIG. 1) and third-party entities utilizing the search service. In some embodiments, query response module generator 210 includes templates and other user tools (e.g., a graphical user interface) that users utilize to create query response modules. Users may use query response module generator 210 to select and combine components of query response modules to create user-specific query response modules.

In the example shown, portions of the communication path between the components are shown. Other communication paths may exist, and the example of FIG. 2 has been simplified to illustrate the example clearly. Although single instances of components have been shown to simplify the diagram, additional instances of any of the components shown in FIG. 2 may exist. Components not shown in FIG. 2 may also exist.

Figure 3:
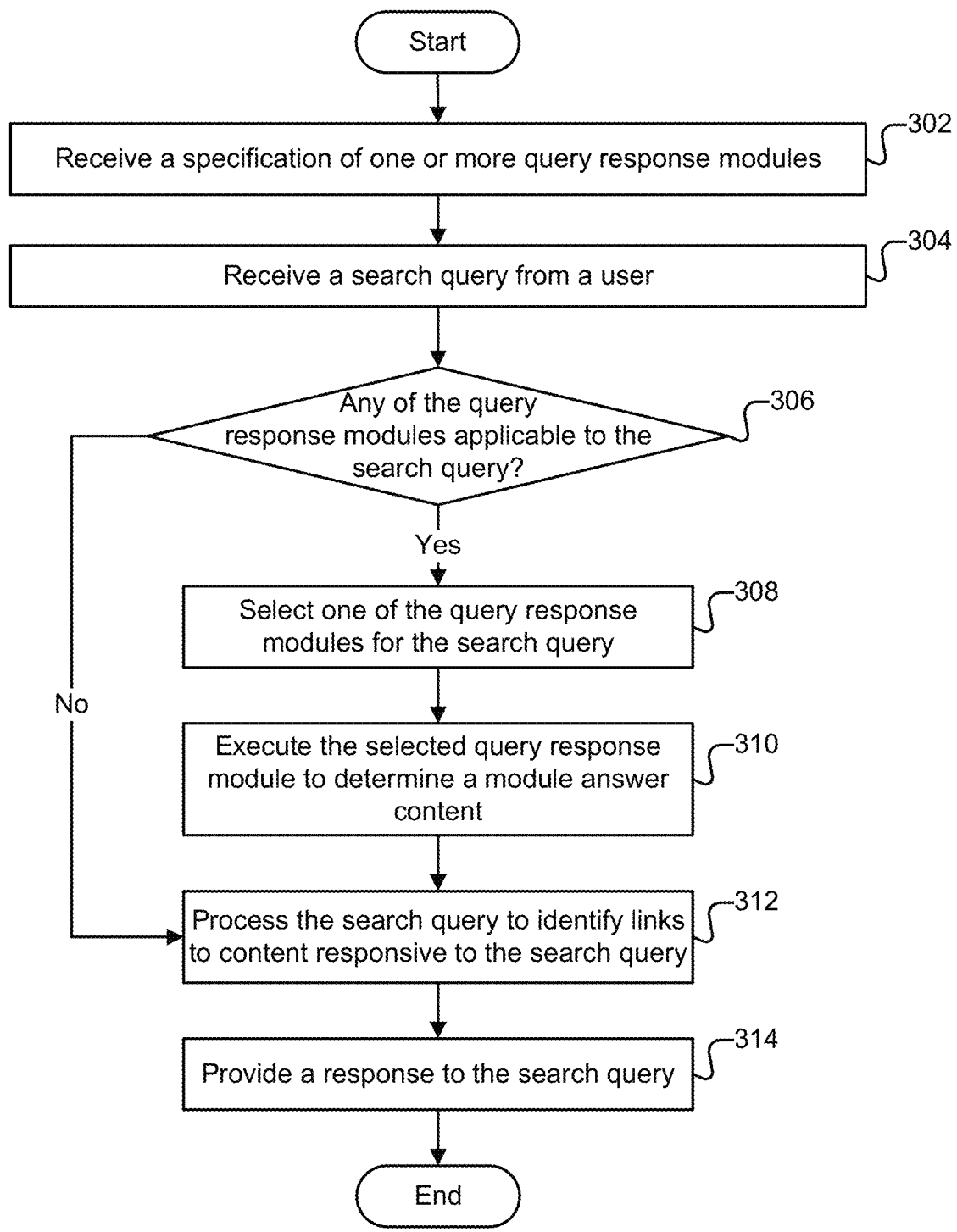
FIG. 3 is a flow chart illustrating an embodiment of a process for receiving a search query and providing a response.

FIG. 3 is a flow chart illustrating an embodiment of a process for receiving a search query and providing a response. In some embodiments, the process of FIG. 3 is performed by search service 112 of FIG. 1.

At 302, a specification of one or more query response modules is received. In some embodiments, query response module specifications are received by query response module generator 210 of FIG. 2 and created query response modules are stored in query response module database 208 of FIG. 2 where they can be retrieved. In many scenarios, the specifications of the one or more query response modules are received from a third-party entity different from an entity providing a search service. For example, the third-party entity may be an organization that is a customer of the entity providing the search service (e.g., search service 112 of FIG. 1). The third-party entity may create the one or more query response modules by utilizing templates and other tools provided by the entity providing the search service.

At 304, a search query from a user is received. In some embodiments the search query is submitted from client 102, 104, or 106 of FIG. 1 via network 108 of FIG. 1. In some embodiments, the search query is a text search query. The search query may be a question in text format to which the user would like to receive an answer. For example, the search query may be: "When is the next company holiday?" or another question.

At 306, it is determined whether there are any query response modules that are applicable to the search query. The search query is processed at least in part with the search service (e.g., search service 112 of FIG. 1) to determine whether any of the one or more query response modules are applicable to the search query. In some embodiments, query response module unit 116 of FIG. 1 or query response module unit 200 of FIG. 2 determines whether there are any applicable query response modules. For example, query response module unit 200 of FIG. 2 may utilize rules engine 204 to determine whether any rules map the search query to any query response modules and utilize natural language understanding engine 206 to determine whether an intent/entity associated with the search query maps to any query response modules. In some embodiments, the query response modules that are analyzed to determine whether there is an applicable query response module are located in query response module database 208 of FIG. 2.

If at 306 it is determined that there is at least one query response module that is applicable to the search query, at 308, one of the query response modules is selected for the search query. It is possible that multiple query response modules are applicable (e.g., one determined using rules engine 204 of FIG. 2 and one determined using natural language understanding engine 206 of FIG. 2). In various embodiments, a most applicable (e.g., most relevant) query response module is selected.

At 310, the selected query response module is executed to determine a module answer content. For example, the user's software, which incorporates query response module software transferred to the user, may make an API call to fetch and process data from a server hosting the search service and then display the data on a display device using the user's device's native rendering technology. It is also possible for the module answer content to be automatically transmitted from the server hosting the search service to the user without software of the user making a call to fetch data from the server. Various data transfer schemes to provide module answer content to the user may be utilized. The module answer content is a search query response associated with the selected query response module. Examples of module answer content include a calendar with a date highlighted, another type of graphic, a string of text, a collection of graphics and text in a box, and other types of responses to search queries.

If at 306 it is determined that there are no query response modules that are applicable to the search query, then steps 308 and 310 are not performed, and instead, step 312 is performed after step 306. In some embodiments, steps 306, 308, and 310 are performed by query response module unit 116 of search service 112 of FIG. 1. At 312, the search query is processed to identify links to content responsive to the search query. In various embodiments, the same search service that selects a query response module applicable to the search query also processes the search query to identify the links to content responsive to the search query. In various embodiments, content links (see above for further details) are identified. For example, the content links may refer to source documents or parts thereof. In some embodiments, step 312 is performed by content links unit 114 of search service 112 of FIG. 1.

At 314, a response to the search query is provided. In various embodiments, if there is at least one query response module that is applicable to the search query, providing the response to the search query includes embedding the module answer content in a user interface providing at least a portion of the identified links. In various embodiments, if there are no query response modules that are applicable to the search query, the response to the search query does not include module answer content. For example, the user interface may provide content links without any module answer content.

Figure 4A:
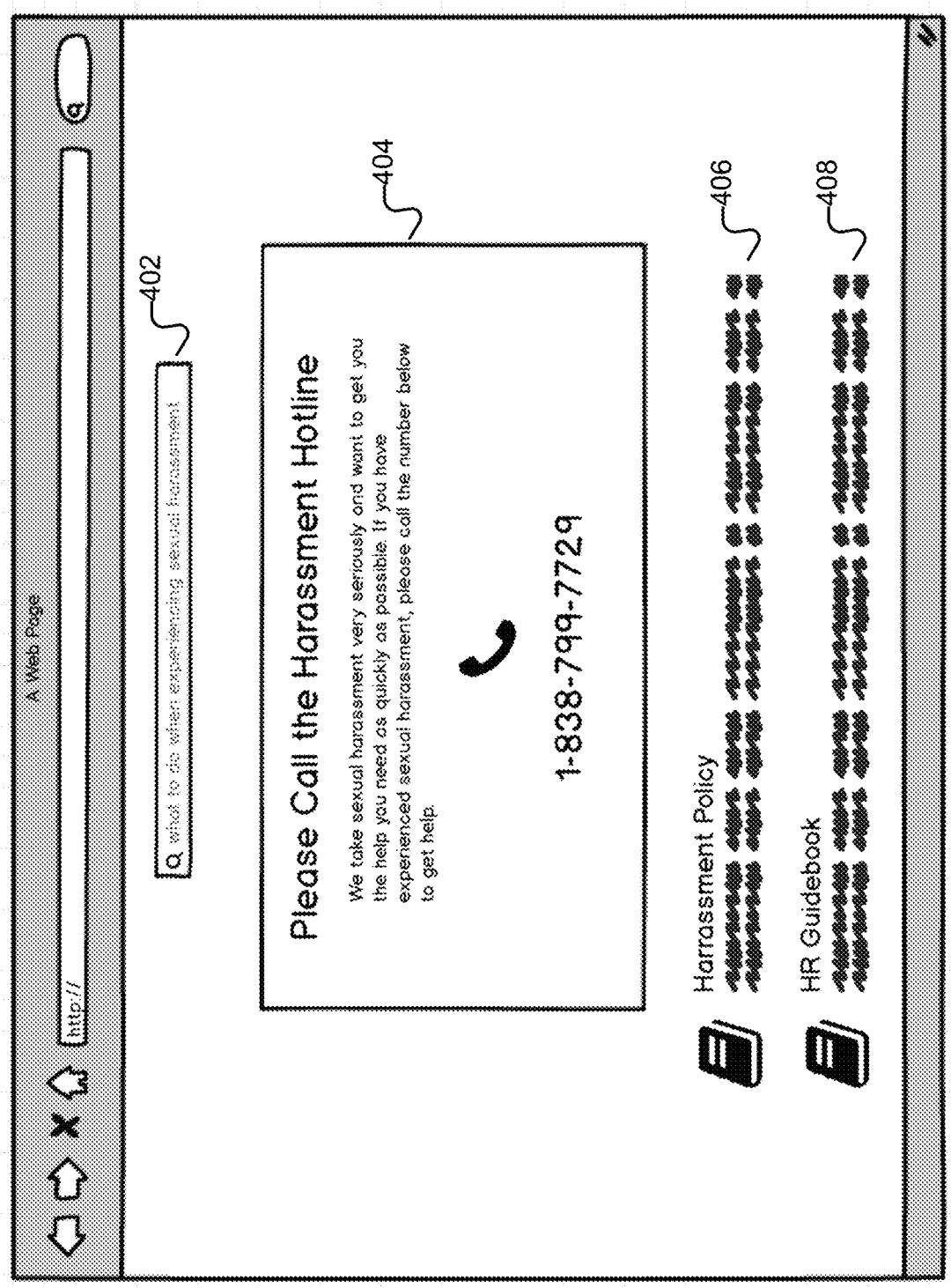
FIGS. 4a and 4b are search query response user interface examples.
Figure 4B:
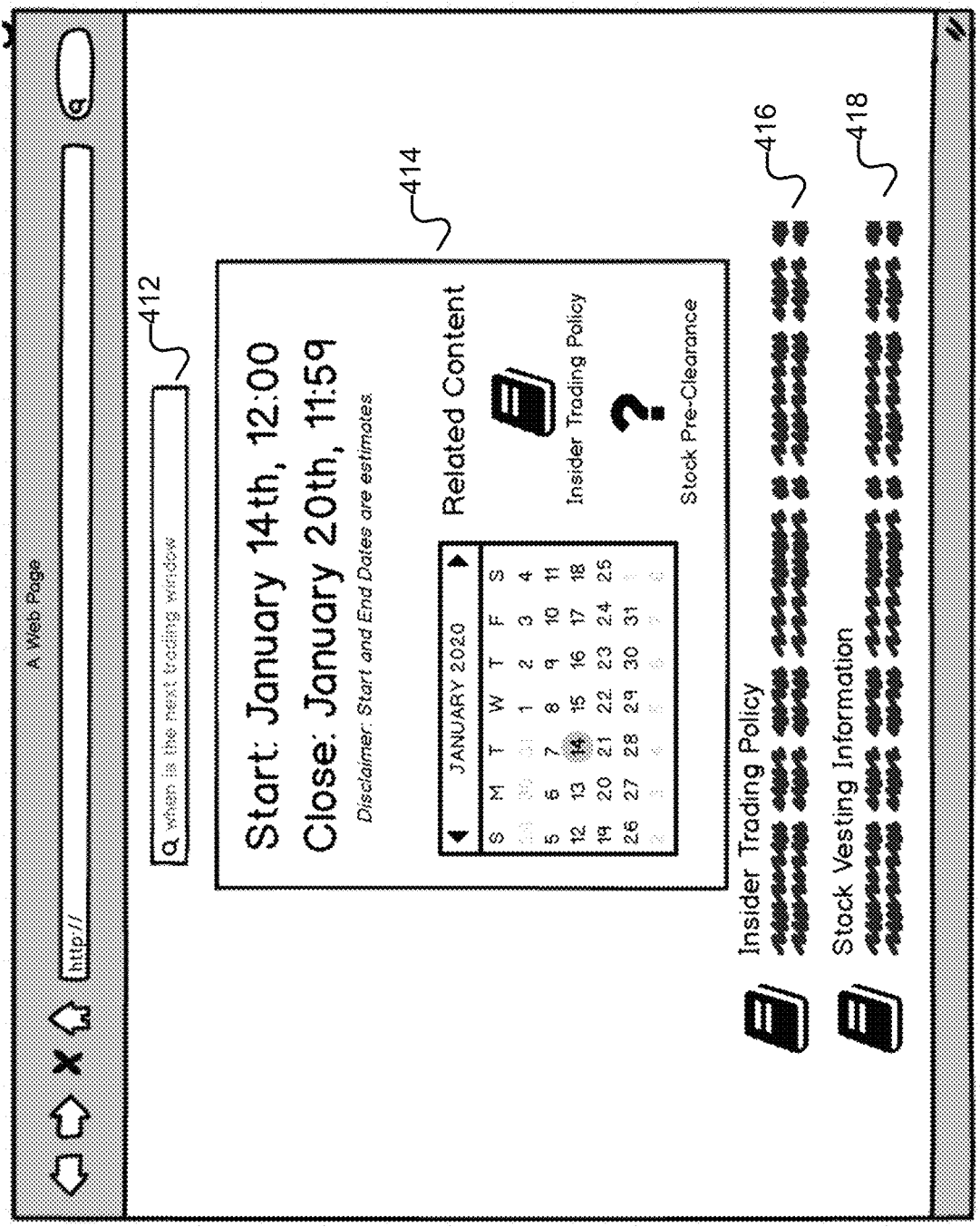

FIGS. 4a and 4b are search query response user interface examples. FIGS. 4a and 4b show query response module content displayed in a user interface providing content links. In some embodiments, these user interface examples are displayed on a display device of a user submitting a search query (e.g., client 102, 104, or 106 of FIG. 1). The examples shown in FIGS. 4a and 4b show answer content from a single query response module for each example. It is also possible for the user interface to provide answer content from multiple query response modules. The examples shown in FIGS. 4a and 4b show query response module answer content together with content links. It is also possible to show query response module answer content by itself or content links by themselves. In some embodiments, content links are provided by content links unit 114 of search service 112 of FIG. 1. In some embodiments, query response module answer content is provided by query response module unit 116 of search service 112 of FIG. 1.

In the example shown in FIG. 4a, a search query is entered into search box 402. In this example, the search query in search box 402 is "what to do when experiencing sexual harassment". In the example shown, query response module answer content 404 is displayed along with content links 406 and 408. Query response module answer content 404 includes text urging a user to call a harassment hotline, other directions, and a phone number with a telephone icon. In the example shown, content link 406 links to a harassment policy document and content link 408 links to a human resources guidebook. In the example shown, the content links refer the user to source documents. It is also possible for the content links to refer the user to portions of source documents. Two content links are shown in the example. It is possible for more content links to be displayed. In various embodiments, the user can click on, scroll through, and otherwise interact with the content links. In various embodiments, the user can also interact with query response module answer content. For example, the user may click on the phone number in query response module answer content 404 to call the phone number.

In the example shown in FIG. 4b, a search query is entered into search box 412. In this example, the search query in search box 412 is "when is the next trading window". In this example, a user entering the search query is an employee of an organization (e.g., a publicly traded company). In the example shown, query response module answer content 414 is displayed along with content links 416 and 418. Query response module answer content 414 includes text indicating the next trading window, a calendar with the start of the trading window highlighted, and links to related content. FIG. 4b illustrates that query response module answer content may include links. In the example shown, the user can click on the links in query response module answer content 414 to see information regarding insider trading policy and stock pre-clearance. It is possible for the links in query response module answer content to be similar to content links. In the example shown, content link 416 also refers the user to an insider trading policy document. In the example shown, content link 418 links to stock vesting information. FIG. 4b is an example of query response module answer content including different types of content (text, graphics, and links in the example shown). FIG. 4b also illustrates that query response module answer content may be user-dependent. For example, a search service may use metadata associated with the search query to determine who the user is and tailor query response module answer content to that user (e.g., if certain employees with sensitive information cannot use the trading window, an alert may be presented indicating that a phone number should be called to receive individualized trading instructions).

Figure 5:
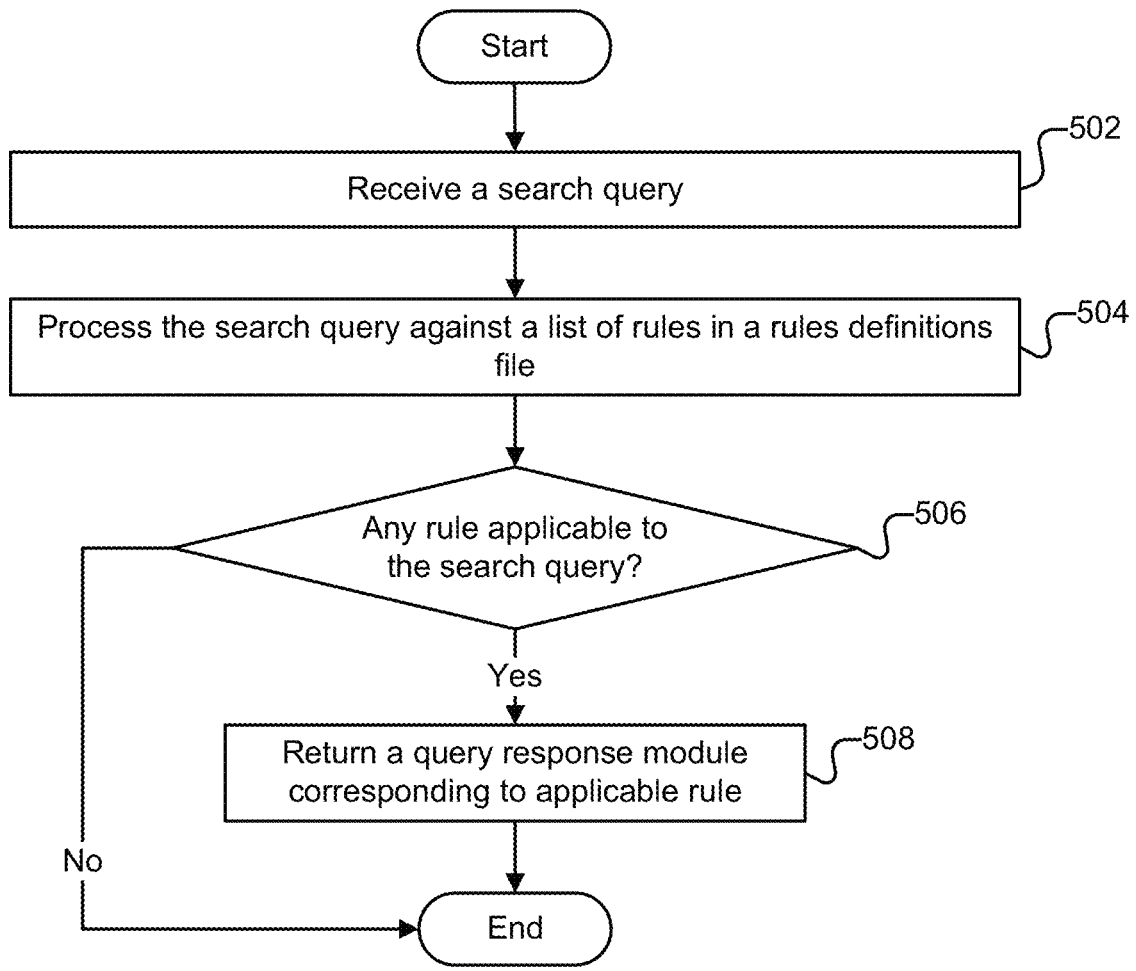
FIG. 5 is a flow chart illustrating an embodiment of a process for utilizing a rules-based approach to determine an applicable query response module.

FIG. 5 is a flow chart illustrating an embodiment of a process for utilizing a rules-based approach to determine an applicable query response module. In some embodiments, the process of FIG. 5 is performed by rules engine 204 of FIG. 2. In some embodiments, at least a portion of the process of FIG. 5 is performed in 306 of FIG. 3.

At 502, a search query is received. In some embodiments the search query is submitted from client 102, 104, or 106 of FIG. 1 via network 108 of FIG. 1. In some embodiments, the search query is a text search query. The search query may be a question in text format to which the user would like to receive an answer. For example, the search query may be: "When is the next company holiday?" or another question.

At 504, the search query is processed against a list of rules in a rules definition file. In various embodiments, each rule definition is mapped to a query response module and uniquely identifies a query response module in the rules-based model. In some embodiments, the rules definition file is accessed by rules engine 204 of FIG. 2. In various embodiments, keyword matching is performed to process the search query against the list of rules. Rules are created to meet user needs. For example, an organization may realize employees frequently search for all-hands meetings, creates an-all hands meeting query response module that provides the time, date, location, etc. of all-hands meetings, and then creates a rule that states that if the text string "all-hands meeting" or some variant is searched, then the all-hands meeting query response module is provided.

At 506, it is determined whether there are any rules applicable to the search query. For example, this may include determining if any keywords in the search query are associated with corresponding rules (e.g., match words in the rules). If at 506 it is determined that there is at least one applicable rule, at 508, a query response module corresponding to an applicable rule is returned. It is possible for there to be more than one applicable rule. For example, a rule can overlap with other rules, e.g., if a search string includes multiple keywords that are associated with different rules and thus different query response modules. In some embodiments, a priority is assigned to each applicable rule and the highest priority rule is selected, which results in the query response module associated with the highest priority rule being provided to the user. It is also possible to utilize another scheme to determine which query response module to provide.

Figure 6:
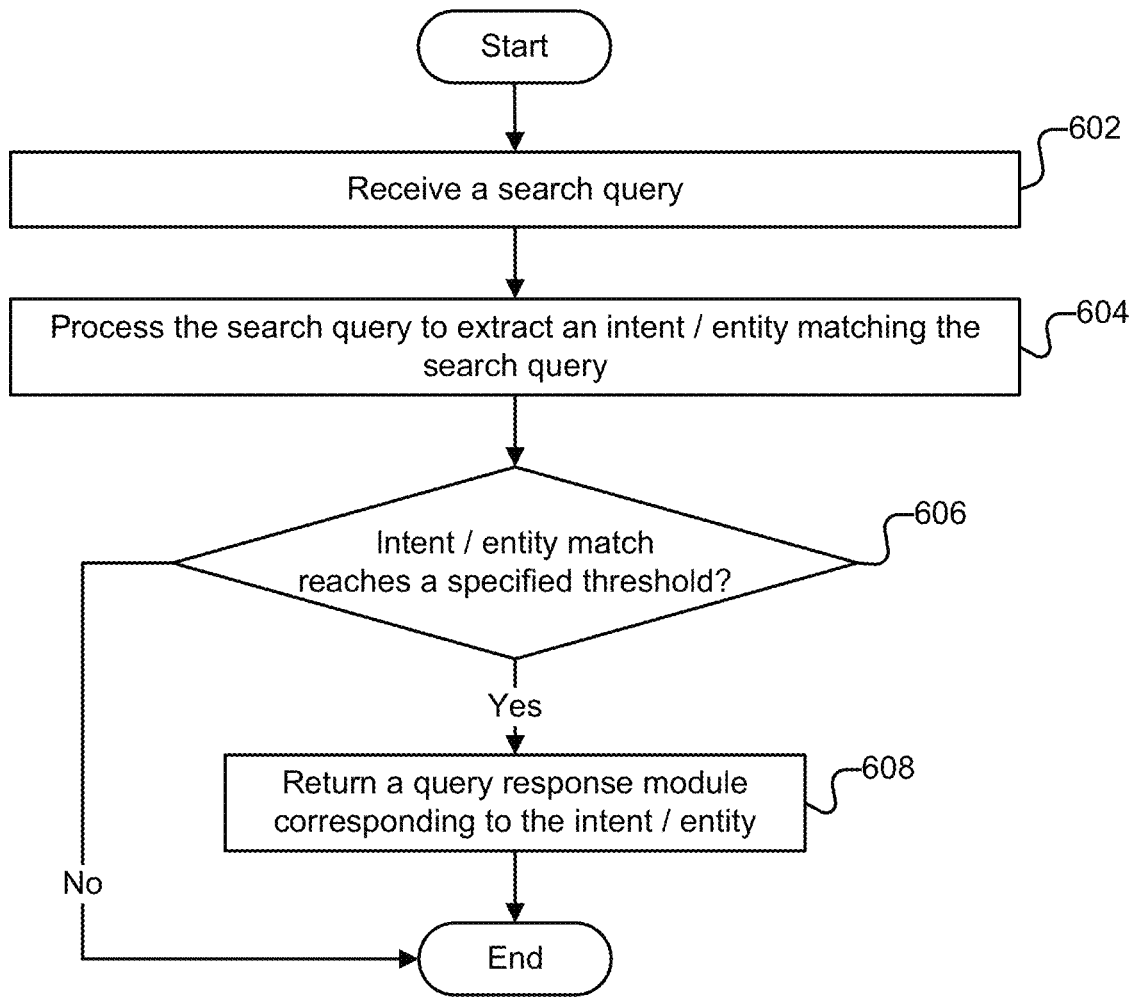
FIG. 6 is a flow chart illustrating an embodiment of a process for utilizing a natural language understanding approach to determine an applicable query response module.

FIG. 6 is a flow chart illustrating an embodiment of a process for utilizing a natural language understanding approach to determine an applicable query response module. In some embodiments, the process of FIG. 6 is performed by natural language understanding engine 206 of FIG. 2. In some embodiments, at least a portion of the process of FIG. 6 is performed in 306 of FIG. 3.

At 602, a search query is received. In some embodiments the search query is submitted from client 102, 104, or 106 of FIG. 1 via network 108 of FIG. 1. In some embodiments, the search query is a text search query. The search query may be a question in text format to which the user would like to receive an answer. For example, the search query may be: "When is the next company holiday?" or another question.

At 604, the search query is processed to extract an intent/entity matching the search query. In various embodiments, the search query includes an utterance that is matched to an intent/entity using a machine learning natural language understanding model operating in inference mode. In various embodiments, the NLU model is trained using historical utterances. Human feedback may be incorporated to refine the NLU model. Examples of NLU models include models utilizing word vector representations, window-based neural networks, recurrent neural networks, long-short-term-memory models, recursive neural networks, and convolutional neural networks. In various embodiments, a confidence score is determined along with the intent/entity match. In some embodiments, the confidence score is based at least in part on a similarity between the utterance in the search query and historical utterances used for training the NLU model.

At 606, it is determined whether the intent/entity match reaches a specified threshold. In some scenarios, the NLU model determines an intent/entity match, but the confidence score associated with the match is low. If the confidence score falls below a specified threshold, the match is rejected. If at 606 it is determined that the intent/entity match reaches the specified threshold, at 608, a query response module corresponding to the intent/entity match is returned. In some embodiments, various intents/entities form intent/entity sets, wherein each intent/entity set maps to a unique query response module. In some embodiments, a mapping table stores mappings between intent/entity sets and query response modules. In some embodiments, the mapping table is accessed by natural language understanding engine 206 of FIG. 2.

Figure 7:
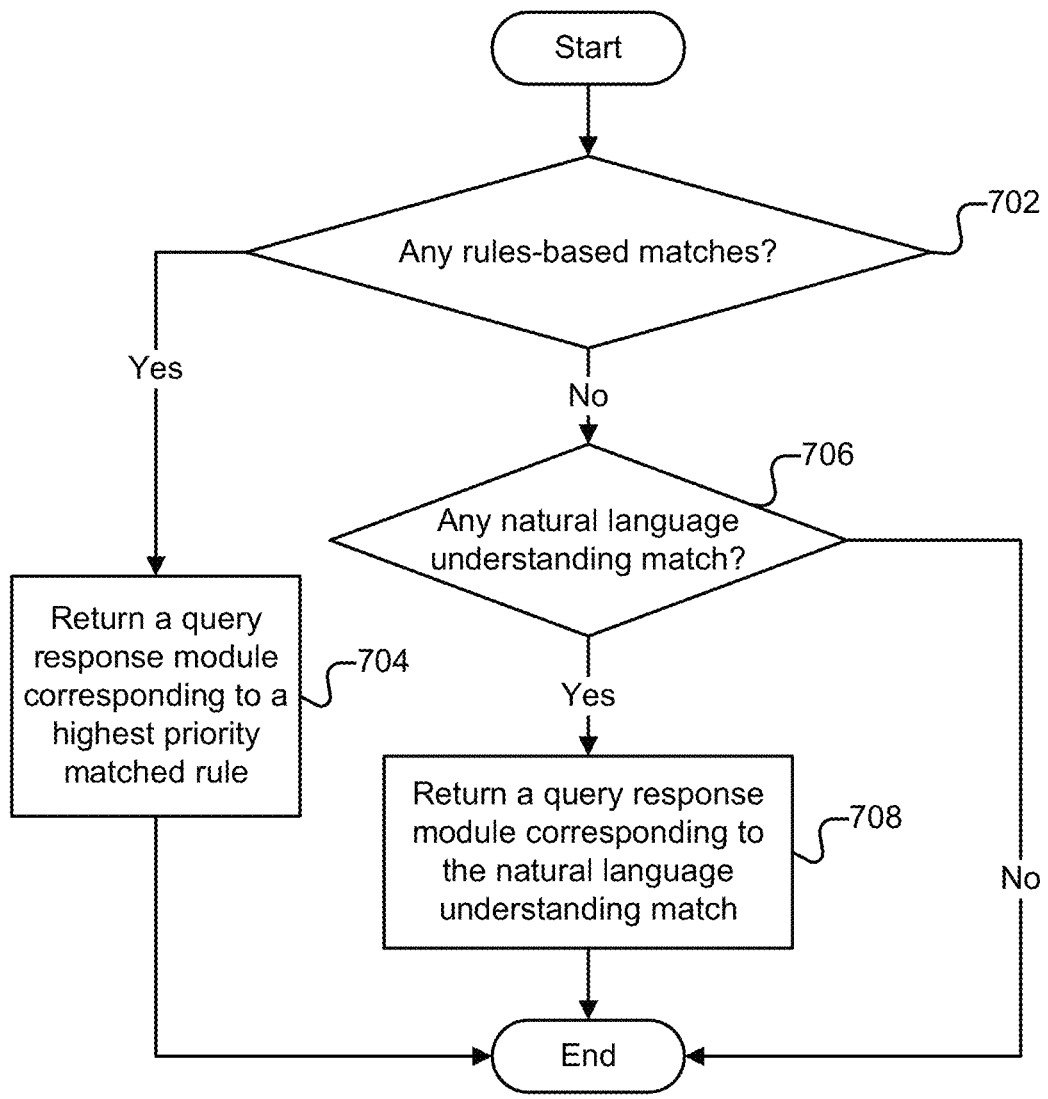
FIG. 7 is a flow chart illustrating an embodiment of a process for selecting a query response module.

FIG. 7 is a flow chart illustrating an embodiment of a process for selecting a query response module. In various embodiments, the query response module is selected for a search query submitted by a user. In some embodiments, the process of FIG. 7 is performed by query response module unit 116 of FIG. 1 or query response module unit 200 of FIG. 2. In some embodiments, at least a portion of the process of FIG. 7 is performed in 308 of FIG. 3.

At 702, it is determined whether there are any rules-based matches that identify any query response modules applicable to the search query. In some embodiments, rules-based matches are identified by rules engine 204 of FIG. 2. FIG. 7 illustrates an approach in which rules-based matches take precedence over NLU matches. Other approaches are also possible to select a query response module to return when a rules-based approach and an NLU approach both identify applicable query response modules.

If at 702 it is determined that there is at least one query response module identified according to a rules-based approach, at 704, a query response module corresponding to a highest priority matched rule is returned. In some scenarios, a rule can overlap with other rules, e.g., if a search string includes multiple keywords that are associated with different rules and thus different query response modules. A priority can be assigned to each applicable rule and the highest priority rule can be selected.

If at 702 it is determined that there are no query response modules identified according to the rules-based approach, at 706, it is determined whether are there is an NLU match that identifies a query response module applicable to the search query. In some embodiments, the NLU match must meet a specified confidence level in order to qualify as a match. In some embodiments, NLU matches are identified by natural language understanding engine 206 of FIG. 2.

If at 706 it is determined that there is an NLU match, at 708, a query response module corresponding to the natural language understanding match is returned. In some embodiments, the query response module is determined by looking up the query response module in a mapping table that at least in part maps search query utterance meanings, as determined using a machine learning model, to query response modules.

Figure 8:
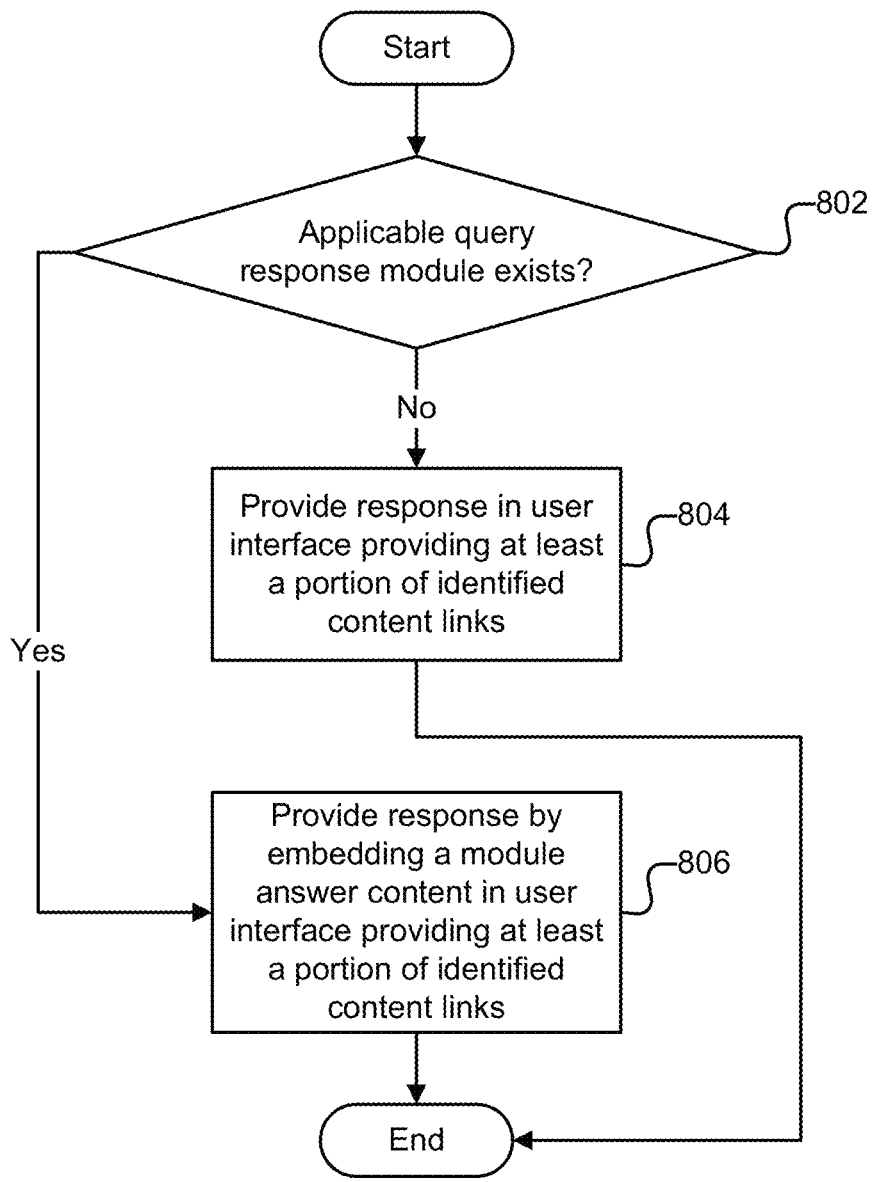
FIG. 8 is a flow chart illustrating an embodiment of a process for providing a search query response in a user interface.

FIG. 8 is a flow chart illustrating an embodiment of a process for providing a search query response in a user interface. In various embodiments, the search query response is provided in response to a search query submitted by a user. In some embodiments, the process of FIG. 8 is performed by search service 112 of FIG. 1. In some embodiments, at least a portion of the process of FIG. 8 is performed in 314 of FIG. 3.

At 802, it is determined whether an applicable query response module (applicable to the search query) exists. The applicable query response module may be identified according to a rules-based and NLU approaches. In some embodiments, whether there is an applicable query response module is determined by query response module unit 116 of FIG. 1 or query response module unit 200 of FIG. 2.

If at 802 it is determined that no applicable query response module exists, at 804, a response (to the search query) is provided in a user interface providing at least a portion of identified content links. In various embodiments, regardless of whether applicable query response modules are identified, content links applicable to the search query are provided. In some embodiments, the content links are determined by content links unit 114 of FIG. 1. If no applicable query response module exists, the response provided to the user does not include query response module content; rather, content links alone are provided.

If at 802 it is determined that an applicable query response module exists, at 806, the response (to the search query) is provided by embedding a module answer content in the user interface providing at least the portion of identified content links. Stated alternatively, when an applicable query response module exists, module answer content generated by the query response module is provided to the user along with content links. Examples of module answer content include a calendar with a date highlighted, another type of graphic, a string of text, a collection of graphics and text in a box, and other types of responses to search queries. FIGS. 4*a* and 4*b* show examples of module answer content embedded in user interfaces that also provide content links. In some embodiments, access control rules (as described in further detail below) are applied to the module answer content.

Figure 9:
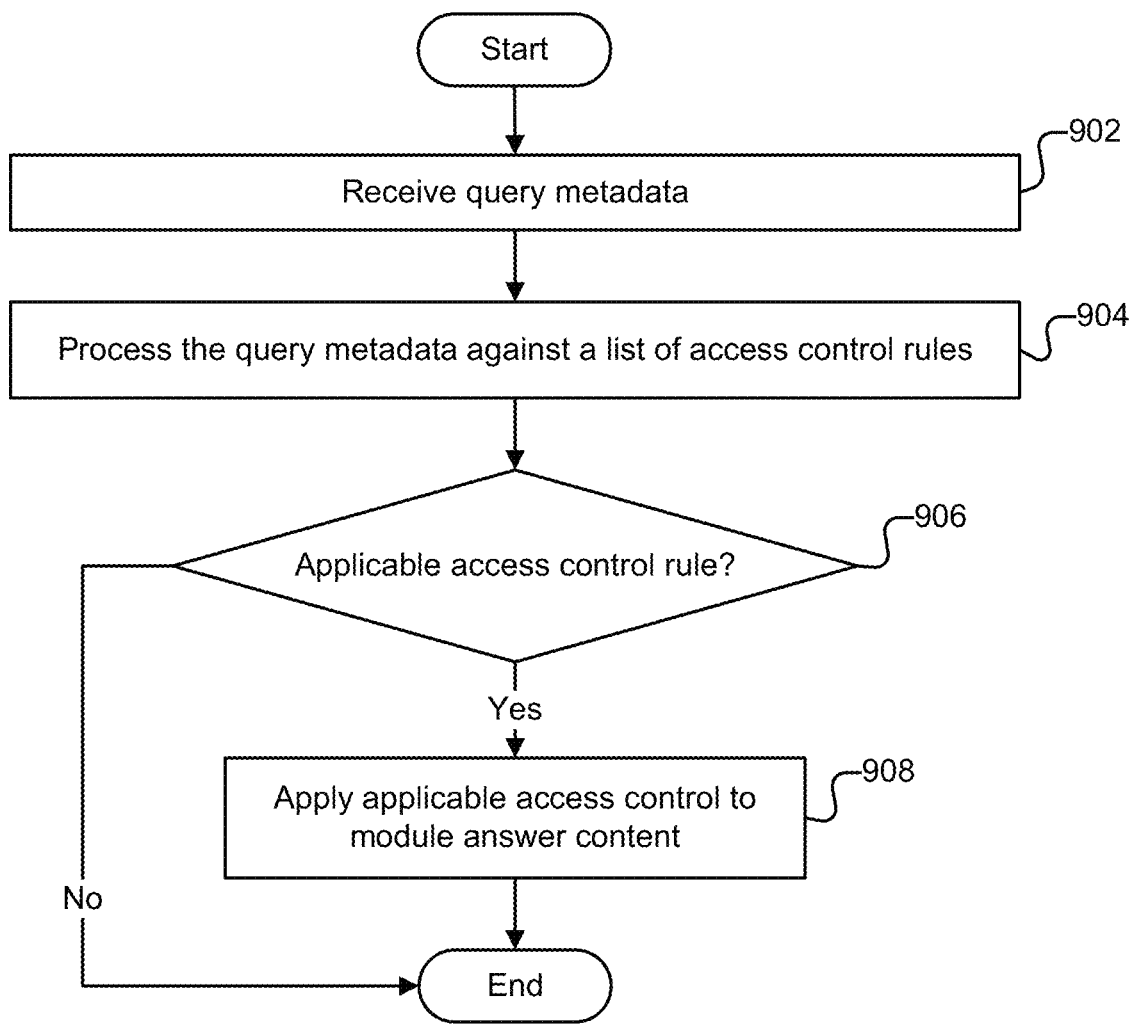
FIG. 9 is a flow chart illustrating an embodiment of a process for controlling access to query response module content.

FIG. 9 is a flow chart illustrating an embodiment of a process for controlling access to query response module content. In some embodiments, the process of FIG. 9 is performed by search service 112 of FIG. 1. In some embodiments, at least a portion of the process of FIG. 9 is performed in 806 of FIG. 8.

At 902, query metadata is received. In various embodiments, the query metadata is associated with a search query submitted by a user. In some embodiments the search query is submitted from client 102, 104, or 106 of FIG. 1 via network 108 of FIG. 1. In some embodiments, the query metadata is received by search service 112 of FIG. 1. As used herein, query metadata refers to data describing the search query but not search query text itself. Examples of query metadata include an identity of the user submitting the search query and an identity of a device the user is using to submit the search query. Additional information (e.g., user role, user security privileges, user department, user location, whether the user was hired recently, device location, etc.) may be included in the query metadata. It is also possible for such information to be retrieved by search service 112 based on the identify of the user and the identity of the device the user is using. For example, such information may be retrieved from employee, device, or other databases. As used herein, query metadata includes metadata received by search service 112 as well as information retrieved based on the metadata received by search service 112.

At 904, the query metadata is processed against a list of access control rules. Examples of access control rules include rules that limit access to content based on a user's role, security privileges, department, location, employment history, etc. For example, a query response module's portion of module answer content comprising links to sensitive documents may be restricted to users of a specified seniority or rank within an organization. As another example, access control rules may allow human resources personnel to view all employee data from a query response module that displays employee profiles but provide a more basic profile to non-human resources personnel. It is also possible to prevent showing any module answer content and show only content links. Content links may also be subject to access control rules. In some embodiments, "view" and "cannot view" lists are maintained to identify who is allowed to view module answer content and who is not allowed.

At 906, it is determined whether there is an applicable (to the search query) access control rule. If at 906 it is determined that there is an applicable access control rule, at 908, the applicable access control rule is applied to module answer content of the corresponding query response module (provided in response to the search query). For example, in response to a determination that a user is not allowed to view certain sensitive documents or other data, the sensitive documents or other data are prevented from being displayed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving (i) one or more query response modules and (ii) a mapping table including one or more intents mapped to the one or more query response modules, wherein the one or more query response modules and the mapping table are defined by a third-party entity different from a search service;
receiving a search query from a user;

processing the search query at least in part with the search service to determine whether any of the one or more query response modules are applicable to the search query including by:
  utilizing a natural language understanding machine learning model to determine an intent associated with the search query; and
  determining that a query response module of the one or more query response modules is applicable to the search query based at least on looking up the query response module in the mapping table that at least in part maps the determined intent to the query response module;
in response to a determination that at least one of the one or more query response modules is applicable to the search query, selecting one of the query response modules for the search query;
executing, by the search service, the selected query response module to determine a module answer content based at least on a mapping of at least one of the intent associated with or an entity of the search query to a user interface component;
processing the search query with the search service to identify links to content responsive to the search query; and
providing a response to the search query including by embedding the module answer content in a user interface and providing at least a portion of the identified links in the user interface, wherein the user interface includes at least one user interface graphical object with action options.

2. The method of claim 1, wherein the search query is received from the user via a network.

3. The method of claim 1, wherein the search query includes text entered by the user.

4. The method of claim 1, wherein processing the search query to determine whether any of the one or more query response modules are applicable to the search query includes determining whether any rule in a list of rules is applicable to the search query.

5. The method of claim 4, wherein determining whether any rule in the list of rules is applicable to the search query includes matching keywords in the search query.

6. The method of claim 1, wherein processing the search query to determine whether any of the one or more query response modules are applicable to the search query includes utilizing in parallel a first approach involving determining whether any rule in a list of rules is applicable to the search query and a second approach involving utilizing a natural language understanding machine learning model to determine an intent associated with the search query.

7. The method of claim 1, wherein the module answer content includes graphical data.

8. The method of claim 1, wherein the module answer content includes links to content responsive to the search query.

9. The method of claim 1, wherein the module answer content includes a visualization of a calendar.

10. The method of claim 1, wherein the module answer content includes text responsive to the search query extracted by the query response module from a document.

11. The method of claim 1, wherein processing the search query to identify links to content responsive to the search query includes searching for words included in the search query in an index generated from a plurality of source documents.

12. The method of claim 1, wherein the module answer content is displayed in the user interface above the identified links and is displayed in a format defined by the one or more query response modules.

13. The method of claim 1, wherein the user interface includes a search box into which the user has entered the search query.

14. The method of claim 1, further comprising receiving metadata associated with the search query and determining based at least in part on the received metadata an identification associated with the user or a device utilized by the user to submit the search query.

15. The method of claim 14, wherein the module answer content is restricted from the user based at least in part on the identification associated with the user or the device utilized by the user to submit the search query.

16. The method of claim 1, wherein the user is an employee or member of the third-party entity.

17. The method of claim 1, wherein the user is a customer of the third-party entity.

18. The method of claim 1, wherein:
processing the search query includes loading a rule from a configuration file, wherein the configuration file stores at least one rule definition made by the third-party entity and each rule definition is mapped to a query response module and uniquely identifies a query response module; and
executing the selected query response module includes presenting the module answer content based at least in part on matching the rule with the search query.

19. A system, comprising:
one or more processors configured to:
  receive (i) one or more query response modules and (ii) a mapping table including one or more intents mapped to the one or more query response modules, wherein the one or more query response modules and the mapping table are defined by a third-party entity different from a search service;
  receive a search query from a user;
  process the search query at least in part with the search service to determine whether any of the one or more query response modules are applicable to the search query including by:
    utilizing a natural language understanding machine learning model to determine an intent associated with the search query; and
    determining that a query response module of the one or more query response modules is applicable to the search query based at least on looking up the query response module in the mapping table that at least in part maps the determined intent to the query response module;
  in response to a determination that at least one of the one or more query response modules is applicable to the search query, select one of the query response modules for the search query;
  execute, by the search service, the selected query response module to determine a module answer content based at least on a mapping of at least one of an intent or an entity of the search query to a user interface component;
  process the search query with the search service to identify links to content responsive to the search query; and
  provide a response to the search query including by embedding the module answer content in a user interface and providing at least a portion of the identified links in the user interface, wherein the user interface includes at least one user interface graphical object with action options; and a memory coupled with the processor and configured to provide the processor with instructions.

20. A computer program product comprising a computer readable storage medium, the computer readable storage medium being non-transitory and comprising computer instructions for:

receiving (i) one or more query response modules and (ii) a mapping table including one or more intents mapped to the one or more query response modules, wherein the one or more query response modules and the mapping table are defined by a third-party entity different from a search service;

receiving a search query from a user;

processing the search query at least in part with the search service to determine whether any of the one or more query response modules are applicable to the search query including by:

utilizing a natural language understanding machine learning model to determine an intent associated with the search query; and determining that a query response module of the one or more query response modules is applicable to the search query based at least on looking up the query response module in the mapping table that at least in part maps the determined intent to the query response module;

in response to a determination that at least one of the one or more query response modules is applicable to the search query, selecting one of the query response modules for the search query;

executing, by the search service, the selected query response module to determine a module answer content based at least on a mapping of at least one of an intent or an entity of the search query to a user interface component;

processing the search query with the search service to identify links to content responsive to the search query; and providing a response to the search query including by embedding the module answer content in a user interface and providing at least a portion of the identified links in the user interface, wherein the user interface includes at least one user interface graphical object with action options.

\* \* \* \* \*